Aug. 19, 1958  F. H. TENNIS  2,848,014
DETENT MECHANISM FOR HYDRAULIC CONTROL VALVES
Filed Dec. 19, 1955  2 Sheets-Sheet 2

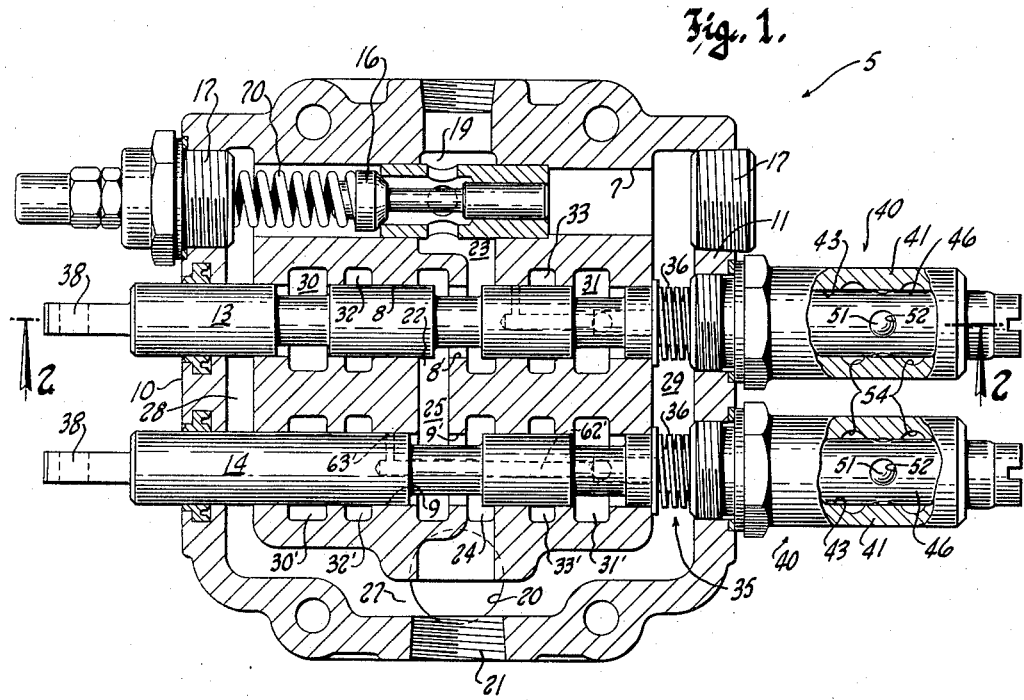
Fig. 1.
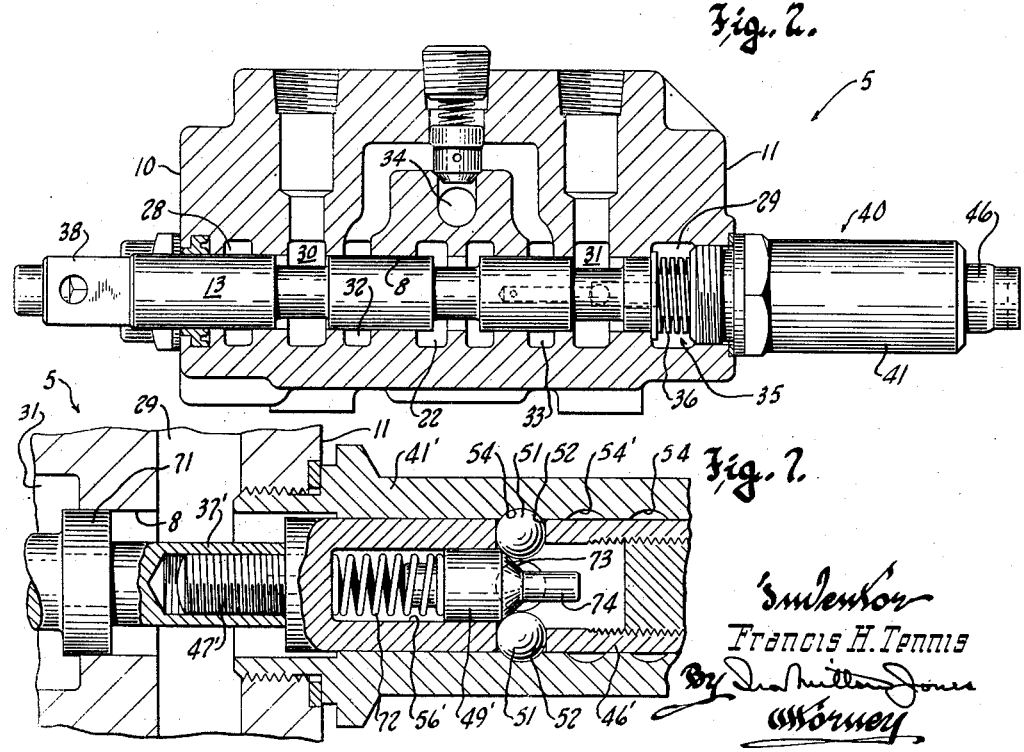
Fig. 2.
Fig. 7.
Inventor
Francis H. Tennis

Inventor
Francis H. Tennis
By [signature]
Attorney

United States Patent Office 2,848,014
Patented Aug. 19, 1958

2,848,014

DETENT MECHANISM FOR HYDRAULIC CONTROL VALVES

Francis H. Tennis, Milwaukee, Wis., assignor to Hydraulic Unit Specialties Co., Pewaukee, Wis., a corporation of Wisconsin Application December 19, 1955, Serial No. 553,783

5 Claims. (Cl. 137—622.5)

This invention relates to detent mechanisms generally and has more particular reference to the provision of an improved detent mechanism which is especially well suited for use with control valves by which fluid pressure operated mechanisms are governed.

One of the primary objects of this invention resides in the provision of a detent mechanism comprising one or more detent members activated by a single spring loaded cam member, and wherein relatively slight spring produced motion of the cam member in one direction along a defined axis effects propulsion of the detent member or members substantially radially outwardly with respect to said axis from inoperative to operative positions.

More specifically, it is a purpose of this invention to provide detent mechanism of the character described which may be constructed as an accessory attachment comprising a bored body part having a detent groove in the wall of its bore and a hollow or tubular part axially slidably received in the bore of the body part and serving as a carrier for the detent members and the single spring loaded cam member by which they are activated. Thus, the detent members may be projected outwardly in holes in the wall of the tubular part in which they are slidably received by spring produced motion of the cam member for engagement in the groove in the bore of the body part upon sliding of the tubular part in a direction to align said holes thereof with the groove.

The detent mechanism thus far described is readily applicable to apparatus of a variety of types having a control member movable back and forth in a housing or the like, merely by attaching the body part of the detent mechanism to the housing and the detent carrier to the movable control member. By way of example, one such apparatus for which the detent mechanism of this invention is especially well suited is hydraulic control valves of a type having a valve element slidable axially back and forth in a bore in the valve body to control the operation of a fluid pressure operated mechanism such as a hydraulic cylinder. In such hydraulic control valves, the valve element is usually manually slidable from a neutral or hold position to one or more operative positions depending upon whether a single acting or a double acting hydraulic cylinder is to be controlled thereby.

While the detent mechanism of this invention may be readily attached to the valve body and valve element of a hydraulic control valve of the character described to cause the valve element thereof to be releasably held in any of a plurality of positions out of which it may be moved manually, it is also an object of this invention to provide detent mechanism featuring automatic releasing means which is operated as a consequence of the attainment of higher than normal operating pressure in one of the passages of a control valve having a valve element biased to a predetermined neutral position, so that the valve element will automatically return to said neutral position at such times as when the piston of an ordinary cylinder controlled by the valve element reaches the end of a power stroke.

Those skilled in the art will immediately recognize that one of the main advantages of such automatically releasable detent mechanism is that it assures against waste of power which generally results when only the conventional relief valve mechanism is relied upon to prevent excessive rise in pressure in the control valve and the hydraulic system governed thereby.

With the foregoing and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 1 is a vertical sectional view through a hydraulic control valve and illustrating the application thereto of the detent mechanism of this invention;

Figure 2 is a cross-sectional view through the control valve taken along the plane of the line 2—2 in Figure 1;

Figure 7 is a fragmentary view similar to Figure 4 but illustrating a modified embodiment of the invention.

Figure 3:
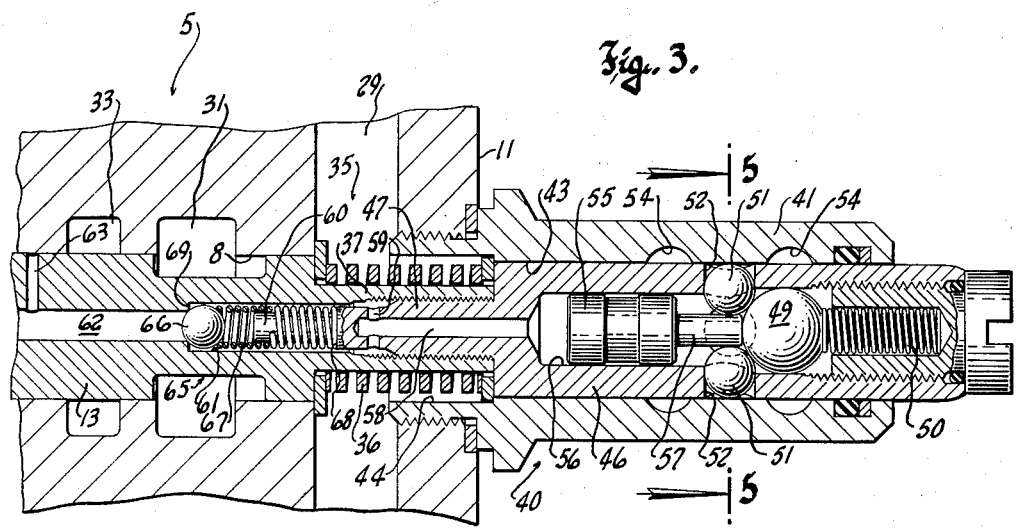
Figure 3 is an enlarged fragmentary detail view of a portion of the control valve seen in Figure 1 and showing the detent mechanism therefor in longitudinal section.
Figure 4:
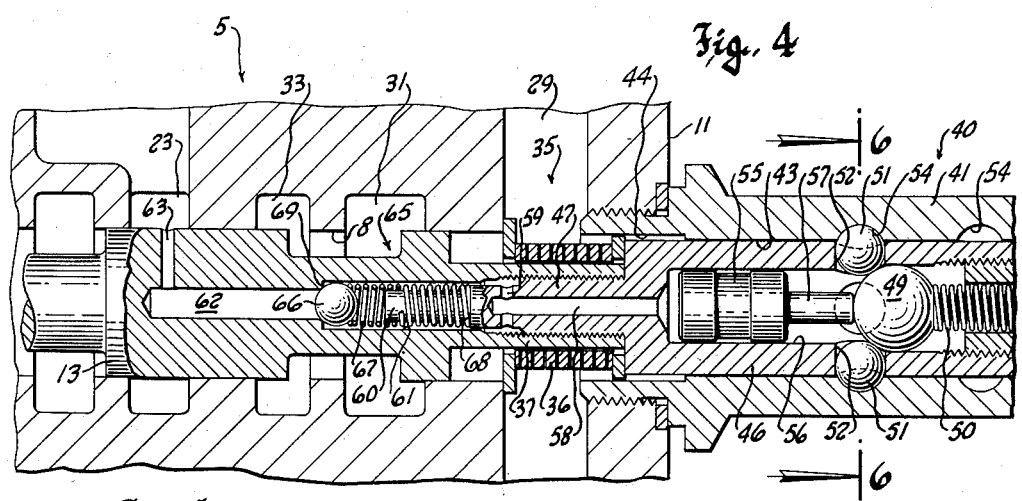
Figure 4 is a view similar to Figure 3 but showing the detent mechanism in one of its operative positions.
Figures 5, 6:
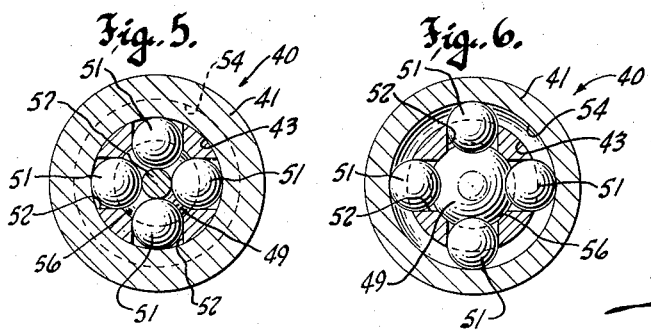
Figure 5 is a cross-sectional view through the detent mechanism taken along the plane of the line 5—5 in Figure 3.
Figure 6 is a cross-sectional view through the detent mechanism taken along the plane of the line 6—6 in Figure 4.

Referring now more particularly to the accompanying drawings in which like numerals indicate like parts throughout the several views, the numeral 5 generally designates the casing or body of a hydraulic control valve like that forming the subject matter of my copending application, Serial No. 518,296, filed June 27, 1955, to which reference may be had for a complete description of the construction of the valve and the arrangement of passages therein. For the purpose of this invention, however, it is sufficient to note that the control valve is provided with three spaced horizontal bores 7, 8 and 9 extending across the body of the valve from one end wall 10 thereof to the other end wall 11 and opening therethrough. The bores 7 and 9 are located near the top and bottom of the body, respectively, while the bore 8 is disposed substantially midway therebetween.

Each of the bores intersects and communicates with a number of passages formed in the interior of the valve body to enable valve elements 13 and 14 slidably received in the bores 8 and 9, respectively, to control the flow of fluid from a pump (not shown) to a plurality of hydraulic cylinders or other pressure operated mechanisms (not shown). The usual relief valve mechanism, generally designated 16, is accommodated in the upper bore 7 to normally prevent the build up of higher than normal operating pressures in the valve passages, it being understood that the opposite ends of the bore 7 are closed by plugs 17.

As brought out at length in my aforesaid copending application, fluid from the pump is introduced into an inlet chamber 19 formed as an enlargement of the upper bore 7, medially of its ends, to normally travel downwardly through the valve and out of its bottom through one or the other of a pair of discharge ports 20 or 21 in the lower end portion of the valve body, a through passage generally designated 22 being provided in the valve body for this purpose. The through passage is comprised of an upper branch 23, a lower branch 24 and an intermediate branch 25. The intermediate branch 25 of the through passage spans and communicates with the two bores 8 and 9, and the upper and lower branches 23 and 24, respectively, of the through passage communicate with the bores 8 and 9 at zones spaced axially a short distance to the right of the ends of the intermediate branch 25 to communicate therewith through holes 8' and 9' in the body, coaxially with the two bores and forming part of the latter.

The upper branch 23 of the through passage, of course, communicates with the inlet chamber 19, while the lower branch 24 of the through passage communicates with the bight portion of a U-shaped exhaust passage 27, as well as to one or the other of the alternate outlets 20—21 in the valve body.

The upright legs 28 and 29 of the exhaust passage 27 are located near the left and right end walls 10 and 11, respectively, of the valve body and crosswise intersect all three of the bores 7, 8 and 9. Inwardly of the legs 28 and 29 of the exhaust passage, the bore 8 for the valve element 13 is enlarged to provide a pair of annular chambers 30 and 31 which communicate with a pair of motor ports opening to the rear of the valve body, and other enlargements of the bore 8 provide a second pair of annular chambers 32 and 33 each intermediate the through passage and one of the motor port chambers and communicating with one another as shown in Figure 2. Normal high operating pressure obtains in the chambers 32 and 33 and in a supply passage 34 which connects them with the inlet chamber 19, whenever the valve element 13, for instance, is shifted in one direction or the other from its neutral position, seen in Figure 1 and closes the hole 8' in its bore to block off communication between the upper and intermediate branches of the through passage 22. Since the valve element 13 is intended for the control of a double acting hydraulic cylinder having its opposite ends communicated with the motor port chambers 30 and 31, the valve element will communicate one of its high pressure supply chambers 32—33 with its adjacent motor port chamber and the other motor port chamber with the adjacent leg of the exhaust passage in each of the two operative positions of the valve element.

The valve element 14 is intended to control a single acting hydraulic cylinder and, while its bore 9 is provided with similarly arranged supply and motor port chambers, it will be understood that, in this case, the motor port leading to one of the chambers 30' is plugged so that fluid under pressure is both supplied to and exhausted from the single acting hydraulic cylinder through the other motor port chamber 31'.

Each of the valve elements 13 and 14 is normally biased to occupy its neutral or hold position shown in Figure 1, by means of a centering device generally designated 35 which includes a helically coiled compression spring 36 encircling a reduced internally threaded coupling 37 on the right hand end of the valve element. As is well understood by those skilled in the art, this spring is so arranged as to be compressed as a consequence of sliding of the valve element in either direction from its neutral position by the manual application of force to the left hand end 38 of the valve element. Normally, the centering spring requires the valve element to be manually held in either of its operative positions until the operator releases the valve element for spring propelled travel to its neutral position.

As clearly shown in Figure 3, where the valve element 13 is in neutral position, its centering spring is endwise confined between one set of axially opposing abutments on the valve element and also between a second set of axially opposing abutments on the body, each in planar alignment with one of those on the valve element. In the present case, the two abutments against which the outer end of the spring bears in the neutral position of the valve element 13 are provided by the detent mechanism 40 of this invention. The detent mechanism for both valve elements being identical, only that for the valve element 13 will be hereinafter described.

The detent mechanism comprises a body part 41 threaded into an enlarged hole in the body in line with the bore of the valve element and having a bore 43 coaxial with the valve element, but slightly smaller in diameter than the latter. The bore 43 opens to the inner end of the body part through a counterbore 44 in which the outer end portion of the centering spring is received. Thus, the junction between the bore 43 in the body part and its counterbore 44 provides a valve body carried abutment against which the outer end of the centering spring reacts in the neutral position of the valve element.

The detent mechanism further comprises a hollow or tubular carrier 46 slidably fitting the bore in the body part 41 and having an extension providing a reduced nipple 47 on its inner end threaded into the coupling 37 on the valve element to join these two parts. The inwardly facing shoulder thus provided between the carrier 46 and its nipple 47 provides the abutment on the valve element against which the outer end portion of the centering spring 36 reacts in the neutral position of the valve element.

Since the carrier 46 is threadedly connected to the valve element, it is constrained to slide back and forth in unison therewith and will also be normally held in neutral or hold position by the centering spring 36. In this neutral position of the carrier, a single cam member provided by a ball 49 movably received in the interior of the carrier and yieldingly urged inwardly toward the valve body by a compression spring 50 reacts upon a plurality of cam followers provided by smaller balls 51 arranged satellite fashion with respect to the large ball 49 to propel the followers radially outwardly in holes 52 through the wall of the tubular carrier and in which the satellite balls are slidably received.

In the present case there are four satellite detent members or balls 51 and the holes 52 in which they are received are circumferentially equispaced and disposed on radial axes lying in a common transverse plane spaced from the cam member 49 in the direction toward which the latter is biased. In the neutral position of the detent carrier 46 seen in Figure 3, the detent balls 51 are urged radially outwardly into engagement with the wall of the bore 43 in the body part 41 under the influence of the spring 50 acting upon the cam member 49.

If desired, the wall of the bore 43 may have a substantially shallow detent groove therein (such as the groove 54' in Figure 7) into which the detent balls 51 may be held engaged by the cam member 49 in the neutral position of the carrier and its valve element, to thus cooperate with the centering spring 36 in holding the valve element in a predetermined neutral or hold position.

The body part 41 is provided with a pair of circumferential grooves 54 opening to its bore 43 and spaced to opposite sides of the plane of the axes of the detent holes 52 a distance equal to the throw of the valve element from its neutral position to one of its operative positions. Thus, when the valve element and the carrier 46 attached thereto are shifted in either axial direction to one or the other of the operative positions of the valve element, the holes 52 in the carrier are brought into registry with one or the other of the grooves 54 in the body part and the detent balls 51 will be snapped radially outwardly in their holes by the spring biased cam member 49, and outer portions of the detent balls will engage in the groove with a force sufficient to hold the valve element against spring biased return motion to its neutral position.

It will be understood, of course, that at any time desired, the operator may manually shift the valve element and its detent carrier out of the detent defined operative position for return to its neutral position by the centering spring 36, merely by exerting sufficient axial force upon the end 38 of the valve element to cause the detent balls 51 to be cammed radially inwardly of their holes 52, due to the action of the curved surfaces of the grooves 54 on the spherical surfaces on the detent members.

One of the most important features of this invention resides in the fact that with the control valve of Figures 1 through 6, fluid pressure responsive means may be provided to automatically effect release of the detent balls 51 and return of either valve element 13 or 14 to its neutral position whenever the piston governed by the valve element reaches the end of a power stroke. Again referring to the valve element 13 and its detent mechanism by way of illustration, this fluid pressure responsive detent releasing means comprises a plunger 55 slidable axially in the bore 56 of the detent carrier 41, inwardly of the cam member 49, and having a reduced axial stem 57 on its outer end passing centrally between the detent balls 51 and normally engaging the cam member 49. The diameter of the stem 57 is such that while it allows full retraction of the detent balls, it prevents inward displacement of the balls from their holes 52.

The plunger is propelled outwardly in the carrier to move the cam member 49 toward an inoperative position with respect to the detent balls whenever the inner end of the plunger is subjected to fluid pressure. For this purpose, the nipple 47 on the inner end of the carrier is provided with a substantially small diameter axial passage 58, the outer end of which opens into the bore 56 in which the plunger operates, and the inner end of which communicates with drilled ports 59 leading radially through the wall of the nipple and opening into the internally threaded hole in the coupling 37 just inwardly of the junction between the threaded portion of the nipple and a further reduced inwardly projecting stem 60 thereon. The stem 60, in turn, extends into an axially bored passage 61 in the adjacent outer end of the valve element 13 leading inwardly from the threaded hole in the coupling 37, and communicating with a smaller diameter axial passage 62 in the valve element.

The passage 62 leads inwardly of the valve element and its inner end terminates just short of the central groove in the valve element and has communication with a port 63 drilled radially in the valve element and opening into the bore in which it slides at a point substantailly midway between the zones at which the bore 8 communicates with the branch 23 of the through passage and the high pressure chamber 33 when the valve element is in its neutral or hold position seen in Figures 1, 2 and 3. The location of the port 63 is such, therefore, that when the valve element is shifted to the left from neutral to one of its detent defined operative positions, the port will communicate with the inlet branch 23 of the through passage; and will be brought into communication with the high pressure supply chamber 33 when the valve element is shifted to the right from neutral to the other of its detent defined operative positions.

In either operative position of valve element 13, therefore, the port 63 and the passageway 62 to which it leads will be in communication with a passage in the valve body in which substantially high normal operating pressure obtains. However, a relief valve mechanism 65 located in the passage 61 of the valve element normally closes off communication between the passagesways 62 and 58 and thus maintains the detent mechanism operative as long as normal high operating pressure obtains in the passages of the control valve.

This relief valve mechanism 65 includes a ball type valve 66 in the inner end of the passage 61, and a helical spring 67 loosely encircling the stem 60 on the detent carrier and confined between a shoulder 68 on the stem and the ball to hold the latter engaged with a seat 69 provided by the junction of passages 61 and 62, to thus block the entrance to the passage 61.

It is important to note that the spring 67 holds the ball 66 on its seat with a force which may be about equal to, or preferably slightly less than that of the spring 70 which acts upon the main relief valve 16 of the control valve. As a result, the detent balls 51 will remain engaged in one or the other of the grooves 54 in the body part 41 in either operative position of the valve element to define and manually releasably hold the valve element in said operative position as long as the piston of a double acting cylinder controlled by the valve element is travelling in one or the other of its power strokes in a normal fashion.

As soon as the piston reaches the end of one of its power strokes, however, the pressure in the communicating inlet and supply passages of the control valve tends to quickly rise above normal high operating pressure and the relief valve mechanism 65 immediately opens in response to such a rise in pressure to communicate either the inlet branch 23 of the through passage or the supply chamber 33 with the inner end of the bore 56 in which the plunger operates, thereby causing the plunger to be propelled outwardly to push the cam member 49 toward disengagement from the detent balls 51.

This has the effect of releasing the detent balls 51 from outward bias, and allows the centering spring to substantially easily effect inward camming of the detent bals into their holes as it returns the valve element and detent carrier to neutral position. When this occurs, the piston of the double acting cylinder governed by the valve element is locked at one of its limits of travel, and the force of the spring 50 acting upon the cam member 49 is again imposed upon the detent balls 51 through the cam member, without interference from the plunger 55.

In this connection, it is to be understodd that the plunger has a substantially loose fit in the carrier bore and that the carrier, in turn, has a substantially loose fit in the bore 43 of the body part in which it slides so that fluid pressure acting upon the plunger is quickly relieved through these clearance spaces to the adjacent branch 29 of the exhaust passage as soon as the valve element is returned to its neutral position.

The detent mechanism for the valve element 14, is also automatically releasable in the same manner, whenever the piston of the single acting cylinder controlled thereby reaches the end of its power stroke. In this case, however, it will be recalled that since the motor port for the outlet chamber 30' is plugged, the outlet chamber 31' provides for both the supply to and the exhaust of hydraulic fluid from the cylinder governed by the valve element. Also in this case, the passage 62' in the valve element 14 extends inwardly beyond the groove in the medial portion of the valve element, and the feeder port 63' with which it communicates is normally located midway between the high pressure supply chamber 32' and the intermediate branch 25 of the through passage, in the neutral or hold position of the valve element.

The exhaust or "lowering" stroke of the cylinder is produced by shifting the valve element to the right from its neutral position seen in Figure 1, to an operative position defined by the engagement of the detent balls 51 in the outermost groove 54 in the body part 41. In order to produce the power or "lift" stroke of the cylinder, the valve element must be shifted to the left from its position seen in Figure 1 to an operative position defined by the engagement of its detent balls 51 in the innermost groove 54 of the body part and in which operative position, the port 63' registers with the high pressure supply chamber 32'. When the piston of the cylinder thus operated by the valve element 14 reaches the end of its power stroke, therefore, the pressure rise above normal high operating pressure which is manifested in the chamber 32', effects unseating of the relief valve mechanism in the outer end portion of the valve element and operation of the plunger to effect release of the detent balls in the manner previously described in connection with the double acting valve element 13. This, of course, causes the valve element 14 to be returned to neutral position by its centering spring 36. Obviously, the relief valve mechanism for this valve element will not operate when the valve element is shifted to the right to a "lowering" position, inasmuch as the branch 25 of the through passage with which the port 63' registers at that position of the valve element, is at zero pressure, and the valve element will remain in its detent defined "lowering" position until it is manually shifted back to neutral.

The detent mechanism of this invention may also be applied to hydraulic control valves without employing the automatic releasing means therefor, as for instance, in the modified embodiment of the invention seen in Figure 7. In this case, it will be understood that the valve element 71 may be of either the single or double acting type and since it has no centering spring, it must be shifted manually in opposite directions to and from its neutral position.

As seen in Figure 7, the body part 41' of the detent mechanism likewise has a pair of axially spaced annular grooves in its bore to be engaged by detent balls 51 on the detent carrier 46' when the valve element 71 is shifted in one direction or the other out of neutral. However in this instance, the neutral position of the valve element and, consequently, of the detent carrier, is defined by the engagement of the detent balls in a third groove 54' in the bore of the body part located midway between the grooves 54.

The cam member 49' which acts upon the detent balls also differs from that described previously, being somewhat similar in shape and location to the plunger 55 of the previous embodiment of the invention. The cam member 49' thus has a cylindrical body portion slidably received in the bore 56' of the detent carrier at a location inwardly of the detent balls 51, and it is urged outwardly away from the valve body by a compression spring 72 confined between the cam member and the inner end of the bore 56' which, in this case, is closed. The spring 72 forcefully holds an outwardly facing frusto-conical cam surface 73 on the cam member in spreading engagement with the detent balls 51.

The cam member in this case has a reduced axial stem 74 thereon projecting outwardly therefrom, centrally between the detent balls, to prevent inward displacement thereof from their holes as a consequence of manual shifting of the valve element from one detent defined position to another, without interfering with normal retracting motion of the detent balls.

Inasmuch as there is no fluid pressure responsive means for effecting automatic release of the detent mechanism in the Figure 7 valve, there is no need for providing communicating axial passages in the valve element 71, its coupling 37' or in the carrier nipple 47'. Hence, the internally threaded hole in the coupling 37' on the valve element 71 may be closed at its inner end, and only a substantially short externally threaded nipple 47' on the inner end of the detent carrier is needed to couple the carrier to the valve element.

From the foregoing description taken together with the accompanying drawings, it will be readily apparent to those skilled in the art that this invention provides a high performance detent mechanism of a type which readily lends itself for use in connection with hydraulic control valves and the like, in which case fluid pressure responsive means may be provided for automatically effecting release of the detent mechanism.

What I claim as my invention is:

1. In detent mechanism of the character described: a body part having a bore therethrough and a circumferential groove in the wall of the bore; an elongated detent carrier comprising a tubular part axially slidably received in said bore, means secured in one end of the tubular part to close the same, and means secured to the other end of the tubular part providing a longitudinal extension thereof by which the tubular part may be shifted back and forth in said bore, the wall of said tubular part having a radial hole therethrough which registers with said body groove in one position of the carrier; a cam member inaccessibly mounted in the hollow interior of said tubular part and at all times movable axially therein, relative to the tubular part, toward and from a position alongside the inner end of said radial hole; yieldable biasing means inside the tubular part, acting upon the came member to urge the same in one direction toward the inner end of said hole; a cam follower in said radial hole having an inner portion at all times projecting into the hollow interior of the tubular part and having an outer portion engaging the wall of the body bore; and a cam surface on said cam member at all times held engaged with the inwardly projecting portion of the follower under the force of said biasing means and thereby tending to cam the follower outwardly of its hole so that said outer portion of the follower will be projected into said groove in the body bore in said one position of the carrier, and the surfaces of said body groove acting as a cam follower to propel the cam inwardly of its hole whenever the carrier is shifted out of said one position thereof as a consequence of the application of force to said extension of the tubular member, such camming of the cam follower inwardly of its hole producing axial motion of the cam member away from said hole, against the force of the yieldable biasing means acting thereon to thereby require shifting of the carrier out of said position thereof by force exerted on said extension in excess of that exerted on the cam member by its yieldable biasing means.

2. The detent mechanism set forth in claim 1 wherein said hole in the wall of the tubular part is one of a plurality of holes therethrough disposed on angularly spaced substantially radial axes lying in a common transverse plane and each having a cam follower received therein with its inner portion at all times projecting into the interior of said tubular part; and wherein the cam surface on said cam member is held wedgingly engaged between said inwardly projecting portions of the followers under the force of said yieldable biasing means and thus tends to cam the followers outwardly of their respective holes.

3. The detent mechanism set forth in claim 1 further characterized by the provision of a fluid pressure responsive plunger in the hollow interior of said tubular part, said plunger having a motion transmitting connection with the cam member to move the same counter to the direction in which it is biased, as a consequence of subjection of said plunger to fluid pressure; and further characterized by the provision of passage means in said detent carrier leading to the interior of said tubular part thereof to provide for subjection of the plunger therein to fluid pressure.

4. The detent mechanism set forth in claim 2 wherein said cam member comprises a ball loosely received in the hollow interior of said tubular part, and wherein said cam followers comprise balls smaller in diameter than said first designated ball; and further characterized by the provision of means centrally disposed inside said tubular part for precluding inward motion of said follower balls out of their respective holes.

5. The detent mechanism set forth in claim 4 further characterized by the fact that said last named means comprises a part on a fluid pressure responsive plunger slidable axially back and forth in the hollow interior of the tubular part, said plunger part having a motion transmitting connection with the ball comprising the cam member and being operable to impart motion thereto counter to the direction in which it is biased in consequence of subjection of said plunger to fluid pressure; and further characterized by the provision of passage means in said carrier leading to the hollow interior of said tubular part thereof and through which fluid pressure may be applied to said plunger.

References Cited in the file of this patent

UNITED STATES PATENTS

| | | |
|---|---|---|
| 2,217,880 | Woodson | Oct. 15, 1940 |
| 2,605,108 | Stephens | July 29, 1952 |
| 2,615,177 | Schlichting | Oct. 28, 1952 |
| 2,689,585 | Presnell | Sept. 21, 1954 |
| 2,757,641 | Meddock | Aug. 7, 1956 |

UNITED STATES PATENT OFFICE
CERTIFICATE OF CORRECTION

Patent No. 2,848,014                                     August 19, 1958

Francis H. Tennis

It is hereby certified that error appears in the printed specification of the above numbered patent requiring correction and that the said Letters Patent should read as corrected below.

Column 8, line 20, for "came" read -- cam --; line 33, for "groove acting as a cam follower to propel the cam" read -- groove acting as a cam to propel the cam follower --.

Signed and sealed this 8th day of November 1960.

(SEAL)

Attest:

KARL H. AXLINE                                            ROBERT C. WATSON

Attesting Officer                                           Commissioner of Patents